United States Patent [19]

Leone

[11] Patent Number: 5,335,760
[45] Date of Patent: Aug. 9, 1994

[54] MAGNETIC FLUX BREAKER FOR A SOLENOID IN A WRAP SPRING CLUTCH

[75] Inventor: Michael F. Leone, Sewell, N.J.

[73] Assignee: Dana Corporation, Toledo, Ohio

[21] Appl. No.: 102,408

[22] Filed: Aug. 5, 1993

[51] Int. Cl.$^5$ ............................................. F16D 27/10
[52] U.S. Cl. ................................... 192/26; 192/33 C; 192/81 C; 192/84 T; 335/251
[58] Field of Search .............. 192/26, 81 C, 84 R, 192/33 C; 335/251

[56] References Cited

U.S. PATENT DOCUMENTS

| | | | |
|---|---|---|---|
| 599,931 | 3/1898 | Davis et al. | 335/251 X |
| 1,015,925 | 1/1912 | Anderson | 335/251 X |
| 1,226,748 | 5/1917 | Burnham | 335/251 X |
| 1,518,020 | 12/1924 | Traver | 335/251 X |
| 1,689,442 | 10/1928 | Lexa . | |
| 2,373,998 | 4/1945 | Burgwin . | |
| 2,735,967 | 2/1956 | Lewus . | |
| 2,904,729 | 9/1959 | Harwood . | |
| 3,559,781 | 2/1971 | Brunelle . | |
| 3,849,876 | 11/1974 | Graefnitz | 29/596 |
| 4,191,283 | 3/1980 | Keeny, III . | |
| 4,321,992 | 3/1982 | Gallo . | |
| 4,829,275 | 5/1989 | Croy | 335/273 |
| 4,884,905 | 12/1989 | Smith | 400/124 |
| 5,031,744 | 7/1991 | Nishimura | 192/81 C |
| 5,170,144 | 12/1992 | Nielsen | 335/229 |
| 5,251,735 | 10/1993 | Lamoureux | 192/84 T |

OTHER PUBLICATIONS

"Wrap Spring Clutches And Brakes", Warner Electric Division, Dana Corporation, Apr. 1990.

Primary Examiner—Leslie A. Braun
Assistant Examiner—Andrea Pitts
Attorney, Agent, or Firm—MacMillan, Sobanski & Todd

[57] ABSTRACT

A solenoid for controlling the engagement and disengagement of a wrap spring clutch includes an electromagnetic coil having a core member disposed adjacent one axial end thereof. An armature is provided within the electromagnetic coil for selective axial movement in response to the energization and deenergization of the electromagnetic coil. The armature is connected to an actuator for the wrap spring clutch such that movement of the armature controls the engagement and disengagement thereof. The core member and the armature are both formed from relatively soft, magnetically permeable materials. A flux breaker is disposed within the electromagnetic coil between one axial end of the armature and the core member. The flux breaker is formed from a relatively hard, non-magnetically permeable material, such as stainless steel. The flux breaker prevents the armature from contacting the core member when attracted thereto by energization of the electromagnetic coil. The flux breaker is provided for minimizing the adverse effects of residual magnetism on the operation of a solenoid. By forming the flux breaker from a material which is harder than the materials used to form the core member and the armature, the useful life of the flux breaker is extended beyond that of prior art flux breakers.

20 Claims, 3 Drawing Sheets

MAGNETIC FLUX BREAKER FOR A SOLENOID IN A WRAP SPRING CLUTCH

BACKGROUND OF THE INVENTION

This invention relates in general to magnetically actuated clutches and in particular to an improved structure for a magnetic flux breaker for minimizing the adverse effects of residual magnetism on the operation of a solenoid which controls the engagement and disengagement of a wrap spring clutch.

Clutches are well known devices which are frequently employed in machinery to selectively connect a source of rotational power to a rotatably driven mechanism. Typically, a clutch includes an input shaft, an output shaft, and some mechanism for selectively connecting the input shaft to the output shaft. When the clutch is engaged, the input shaft is connected to the output shaft so as to rotatably drive the driven mechanism. When the clutch is disengaged, the input shaft is disconnected from the output shaft.

One well known type of clutch is a wrap spring clutch. A basic wrap spring clutch includes an input hub or shaft, an output hub or shaft, and a coiled drive spring for selectively causing the input hub to rotatably drive the output hub. To accomplish this, the input hub and the output hub are provided with adjacent, axially aligned cylindrical surfaces. Portions of the drive spring are disposed about each of these cylindrical surfaces. The drive spring has a relaxed inner diameter which is slightly smaller than the outer diameter of the cylindrical surfaces of the input and output hubs. Thus, as is well known in the art, when the input hub is rotated in a first direction, the drive spring is wrapped tightly about the co-axially oriented cylindrical surfaces. As a result, the output hub is driven to rotate in the first direction with the input hub. When the input hub is rotated in a second direction, however, the drive spring is expanded about the co-axially oriented cylindrical surfaces. As a result, the output hub is not driven to rotate in the second direction with the input hub.

To control the engagement and disengagement of the wrap spring clutch efficiently, the drive spring is usually formed having a control tang at one or both ends thereof. The control tang is formed integrally with the drive spring and is provided for facilitating the expansion and contraction of the drive spring about the cylindrical surfaces of the input and output hubs. The control tang is fixed within a hollow cylindrical control collar disposed about the drive spring for rotation therewith. The external surface of the control collar is provided with one or more stops which are selectively engaged by a pivot arm. When the control collar is engaged by the pivot arm, the control tang is moved such that the drive spring expands about the input and output hubs, resulting in disengagement of the wrap spring clutch. When the control collar is not engaged by the pivot arm, the drive spring contracts about the input and output hubs, resulting in engagement of the wrap spring clutch. Movement of the pivot arm, therefore, determines whether the wrap spring clutch is engaged or disengaged.

A solenoid is usually connected to the pivot arm for moving it as described above to cause engagement and disengagement of the wrap spring clutch. As is also well known, the solenoid includes an armature which is axially movable in response to electrical current passed through an electromagnetic coil. When no electrical current is passed through the electromagnetic coil, the armature is urged toward a first position by a spring or other resilient return mechanism. When the electromagnetic coil is energized, the armature is drawn toward a second position against the urging of the spring. As a result, the pivot arm can be selectively moved into and out of engagement with the control collar to control the operation of the wrap spring clutch.

In some applications for wrap spring clutches, the speed of the machinery used in conjunction with the clutch is limited by the speed of movement of the armature when the electromagnetic coil is engaged. In order to increase the speed at which the armature is moved when the electromagnetic coil is energized, it is known to provide the solenoid with a core member formed from a magnetically permeable material. The core member is positioned axially adjacent to the electromagnetic coil and forms a focused path for magnetic flux generated by the energized electromagnetic coil. As a result, the intensity of the magnetic field generated by the energized electromagnetic coil is increased in the vicinity of the armature, and the armature is quickly moved when the electromagnetic coil is energized.

One impediment to rapid movement of the armature has been found to be residual magnetism created in the core member and armature. This residual magnetism is caused by the slight permanent magnetization of the core member and the armature by the magnetic field generated by the electromagnetic coil, especially when the coil is energized by a direct electrical current. The resultant slight magnetic attraction between the armature and the core member inhibits free relative movement therebetween, thus slowing the movement of the armature when the electromagnetic coil is deenergized. Also, because the armature repeatedly impacts the core member at high speeds, deformation of the inner axial end of the armature can occur, impairing or preventing operation of the solenoid.

To minimize the effects of residual magnetism and prevent the armature from impacting the core member, prior wrap spring clutch solenoids have provided articles referred to as flux breakers between the inner axial ends of the armatures and the adjacent core members. These prior art flux breakers have been embodied as relatively thin discs having outer diameters which are slightly less than the inner diameters of the associated electromagnetic coils. Prior art flux breakers have been formed from relatively soft, non-magnetically permeable materials, such as rubber, mylar, and bronze. By relatively soft, it is meant that the materials used to form the flux breaker were softer than the materials used to form the armature and the core member.

Flux breakers formed from these prior art materials having functioned satisfactorily for minimizing the effects of residual magnetism and limiting impact damage to the armature. Unfortunately, it has been found that such prior art flux breakers themselves were prone to deformation and damage as a result of repeated impacts by the armature. As a result, prior art flux breakers had to be replaced frequently, resulting in undesirable effort and expense for maintenance. Thus, it would be desirable to provide an improved structure for a magnetic flux breaker for minimizing the adverse effects of residual magnetism on the operation of a solenoid for controlling the engagement and disengagement of a wrap spring clutch which extends the useful life thereof.

SUMMARY OF THE INVENTION

This invention relates to an improved structure for a solenoid for controlling the engagement and disengagement of a wrap spring clutch. The solenoid includes an electromagnetic coil having a core member disposed adjacent one axial end thereof. An armature is provided within the electromagnetic coil for selective axial movement in response to the energization and deenergization of the electromagnetic coil. The armature is connected to an actuator for the wrap spring clutch such that movement of the armature controls the engagement and disengagement thereof. The core member and the armature are both formed from relatively soft, magnetically permeable materials. A flux breaker is disposed within the electromagnetic coil between one axial end of the armature and the core member. The flux breaker is formed from a relatively hard, non-magnetically permeable material, such as stainless steel. The flux breaker prevents the armature from contacting the core member when attracted thereto by energization of the electromagnetic coil. The flux breaker is provided for minimizing the adverse effects of residual magnetism on the operation of a solenoid. By forming the flux breaker from a material which is harder than the materials used to form the core member and the armature, the useful life of the flux breaker is extended beyond that of prior art flux breakers.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
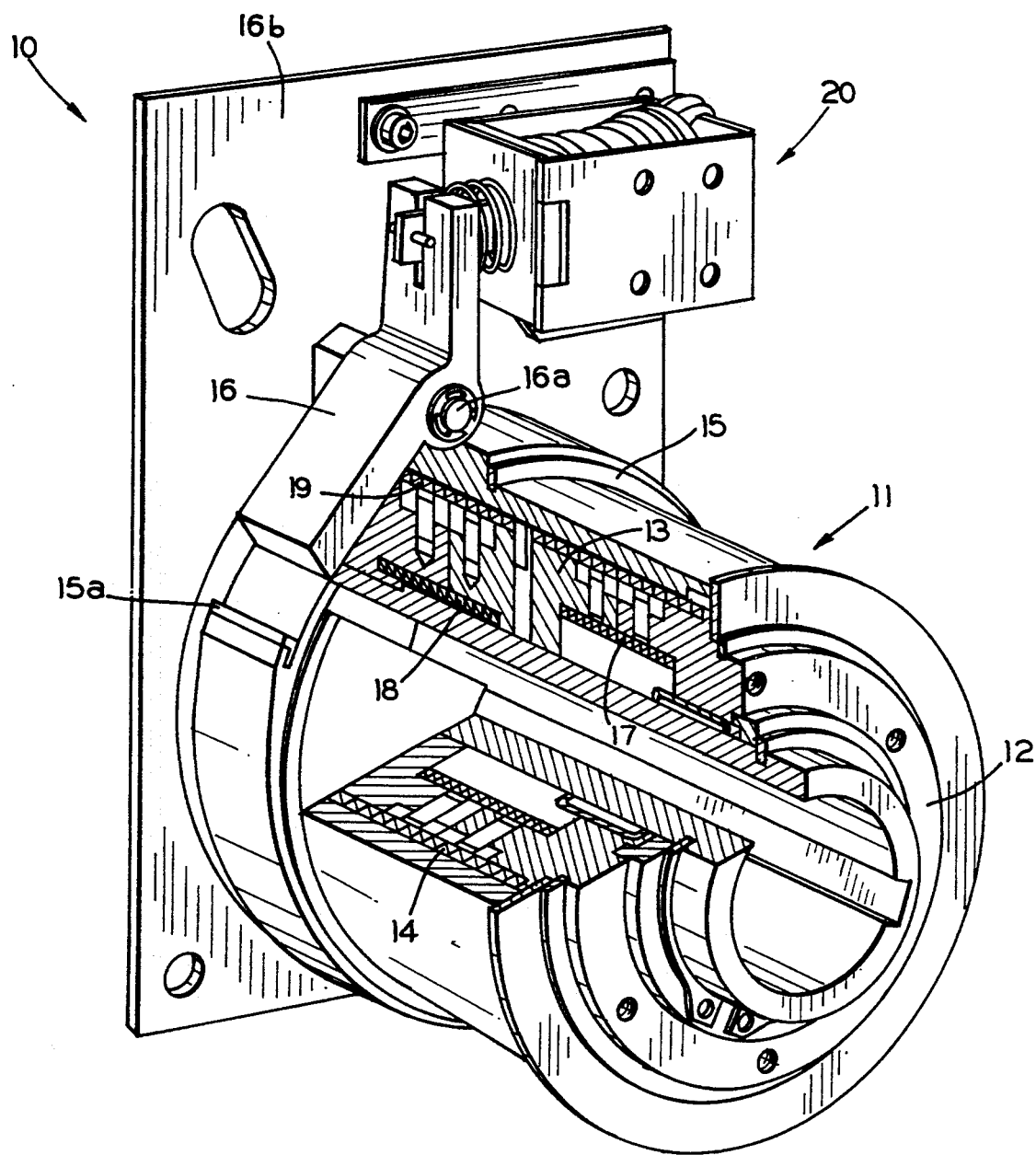
FIG. 1 is a perspective view of a wrap spring clutch including a solenoid actuator assembly in accordance with this invention.

Referring now to the drawings, there is illustrated in FIG. 1 a wrap spring clutch and actuator assembly, indicated generally at 10, in accordance with this invention. The assembly 10 includes a wrap spring clutch, indicated generally at 11, which is conventional in the art. The wrap spring clutch 11 includes an input hub 12, an output hub 13, and a helical drive spring 14. The input hub 12 is adapted to be connected to a source of rotational power, while the output hub 13 is adapted to be connected to a driven load. The helical windings of the drive spring 14 are wrapped about co-axially oriented cylindrical surfaces provided on both the input hub 12 and the output hub 13.

The relaxed inner diameter of the drive spring 14 is slightly smaller than the outer diameter of the cylindrical surfaces of the input hub 12 and the output hub 13. Thus, when the input hub 12 is rotated in a first direction (clockwise when viewing FIG. 1), the drive spring 14 is wrapped tightly about the co-axially oriented cylindrical surfaces. As a result, the output hub 13 is driven to rotate in the first direction with the input hub 12. When the input hub 12 is rotated in a second direction (counterclockwise when viewing FIG. 1), the drive spring 14 is expanded about the co-axially oriented cylindrical surfaces. As a result, the output hub 13 is not driven to rotate in the second direction with the input hub 12.

Means are provided for selectively releasing the engagement of the output hub 13 by the drive spring 14 when the input hub 12 is rotated in the first direction. In the illustrated embodiment, this means for selectively releasing includes a rotatable control collar assembly 15 which is disposed concentrically about the drive spring 14. The control collar assembly 15 is connected to one tang or end (not shown) of the drive spring 14. The outer surface of the control collar assembly 15 has one or more ramp-shaped stops 15a (only one is illustrated) formed thereon for a purpose which will be explained below.

Figure 2:
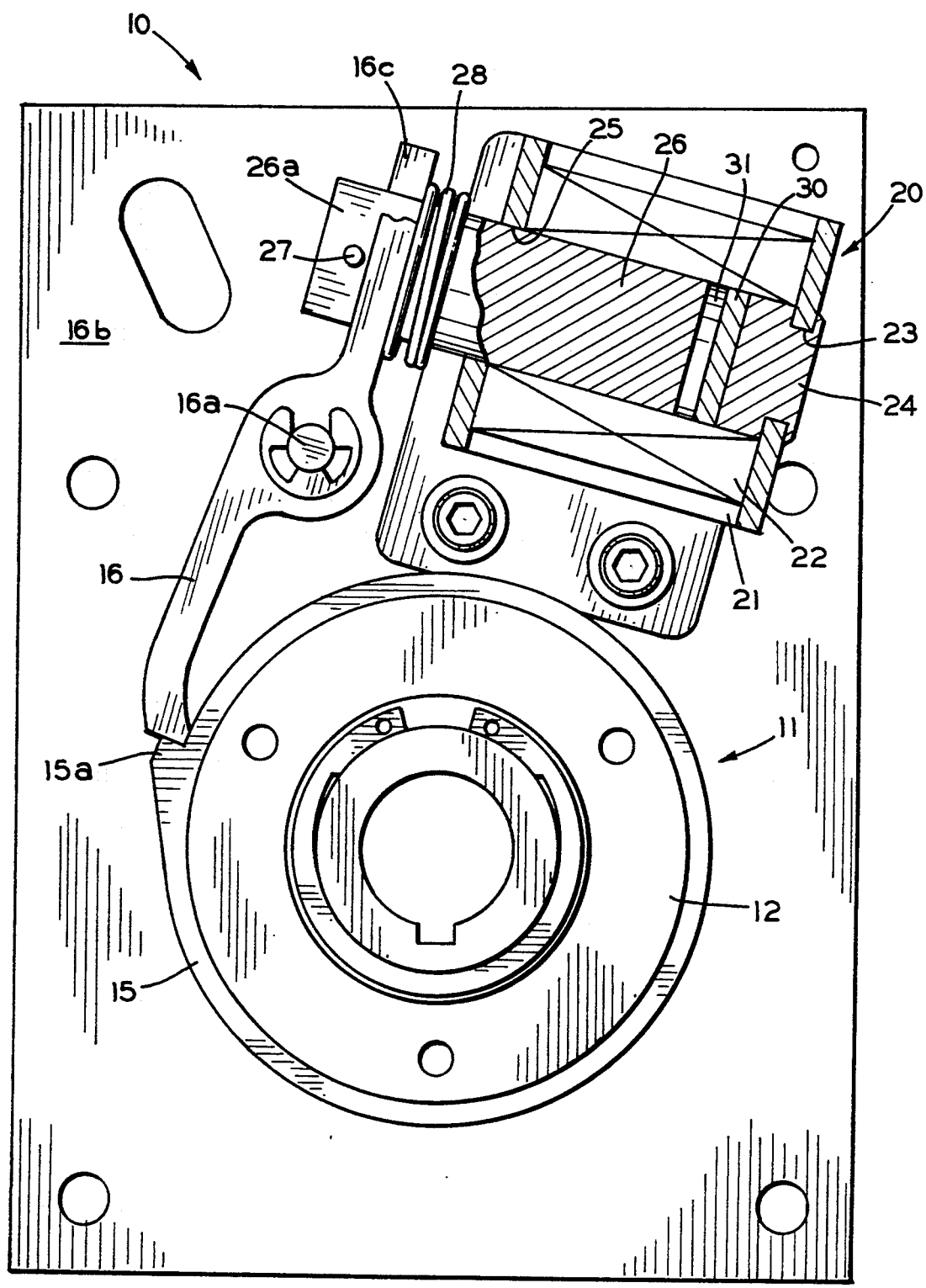
FIG. 2 is a front elevational view, partly in cross section, of the wrap spring clutch illustrated in FIG. 1, wherein the solenoid actuator assembly is shown in a de-energized condition and the actuator arm is shown in a first position.
Figure 3:
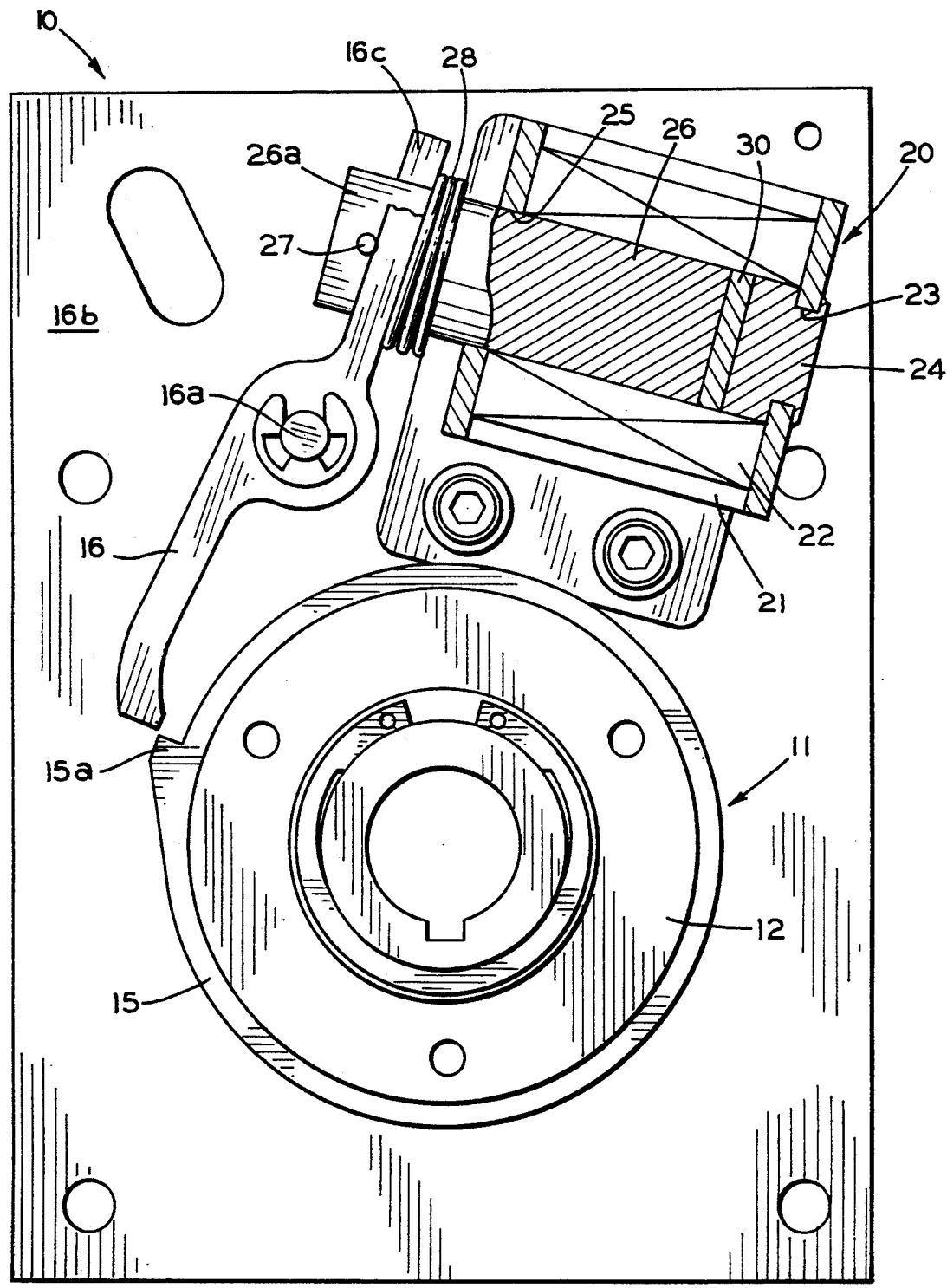
FIG. 3 is a front elevational view similar to FIG. 2, wherein the solenoid actuator assembly is shown in an energized condition and the actuator arm is shown in a second position.

The wrap spring clutch 11 further includes an angled actuator arm 16 which is pivotably mounted on a pivot pin 16a. The pivot pin 16a is, in turn, secured to a support plate 16b upon which the other components of the wrap spring clutch 11 are mounted. The pivot pin 16a divides the actuator arm 16 into an upper leg and a lower leg. The upper leg of the actuator arm 16 is provided for effecting pivoting movement thereof, as will be described in detail below. The lower leg of the actuator arm 16 is provided for selectively engaging one of the stops 15a formed on the control collar assembly 15 when the input hub 12 is rotated in the first direction. When the actuator arm 16 is moved to a first position so as to engage one of the stops 15a as shown in FIG. 2, the drive spring 14 is expanded as discussed above to release the engagement between the input hub 12 and the output hub 13. When the actuator arm 16 is moved to a second position so as to not engage any of the stops 15a as shown in FIG. 3, the drive spring 14 contracts as discussed above to engage the input hub 12 and the output hub 13. The upper end of the upper leg of the actuator arm 16 is formed having a slot 16c for a purpose which will be explained below.

The wrap spring clutch 11 further includes an anti-overrun spring 17, an anti-backup spring 18, and a brake hub and spring assembly 19, all of which are conventional in the art. The structure and operation of the wrap spring clutch 11 and associated components thus far described are so well known in the art that a detailed discussion thereof is unnecessary. However, reference may be made to U.S. Pat. No. 4,321,992 to Gallo, owned by the assignee of this invention, for additional information regarding the basic structure and operation of wrap spring clutches. The disclosure of that patent is incorporated herein by reference.

Means are provided for moving the pivotable actuator arm 16 between the first position illustrated in FIG. 2 and the second position illustrated in FIG. 3. This means for moving the actuator arm 16 includes a solenoid actuator assembly, indicated generally at 20. The assembly 20 includes a housing 21 which is preferably formed from a relatively soft, magnetically permeable material, such as soft or mild steel. Within the housing 21, an electromagnetic coil 22 is disposed. The electromagnetic coil 22 is preferably formed from multiple windings of a single electrically conductive wire, the ends of which are connected to terminals (not shown) to facilitate connection to a source of electrical power. As is well known in the art, a magnetic field is generated by the electromagnetic coil 22 when electrical current is passed therethrough. The housing 21 is mounted on the support plate 16b by any conventional means.

A first opening 23 is formed through one axial end of the housing 21 which is remote from the actuator arm 16. Within that first opening, a core member 24 is mounted. The core member 24 is also preferably formed of a relatively soft, magnetically permeable material, such as iron, and is immovably secured to the housing 21. This can be accomplished by initially forming the core member 24 having an end portion which is smaller in diameter than the diameter of the first opening 23. Then, the reduced diameter end portion of the core member 24 is inserted through the first opening 23. Lastly, the exposed end portion is staked or otherwise enlarged to immovably secure the core member 24 to the housing 21 as illustrated. A second opening 25 is formed through the other axial end of the housing 21 adjacent to the actuator arm 16.

An axially movable armature 26 is provided within the solenoid actuator assembly 20. The armature 26 is disposed within the electromagnetic coil 22 contained within the housing 21 for free axial movement. One axial end of the armature 26 extends through the second opening 25 formed through the axial end of the housing 21 and is provided with an axially extending flat tab portion 26a. The flat tab portion 26a of the armature 26 extends through the slot 16c formed through the upper end of the upper leg of the actuator arm 16. A retaining pin 27 is press fit into an aperture formed through the flat tab portion 26a of the armature 26 on the side of the actuator arm 16 opposite to the housing 21.

A coiled spring 28 or other resilient device is disposed about the armature 26 between the axial end of the housing 21 containing the second opening 25 and the actuator arm 16. The spring 28 reacts against the axial end of the stationary housing 21 to urge the upper end of the actuator arm 16 away from the housing 21 into engagement with the retaining pin 27. Thus, the upper end of the actuator arm 16 is effectively connected to the armature 26 for movement therewith. The spring 28 is also effective to urge the armature 26 and the actuator arm 16 toward respective first positions illustrated in FIG. 2. In this position, the lower end of the actuator arm 16 is moved into a location wherein it will be engaged by one of the stops 15a provided on the control collar 15 when the wrap spring clutch 11 is rotated. When this occurs, the drive spring 14 is expanded as discussed above to release the engagement between the input hub 12 and the output hub 13. All of this occurs so long as the electromagnetic coil 22 is de-energized.

The armature 26 is formed from a relatively soft, magnetically permeable material, such as iron. If desired, the armature 26 may be formed from the same material as the core member 24. Thus, as well known in the art, when electrical current is passed through the electromagnetic coil 22, the magnetic field generated thereby attracts the armature 26 toward a position of minimum magnetic reluctance. This second position is illustrated in FIG. 3, wherein the armature 26 is moved axially within the electromagnetic coil 22 against the urging of the spring 28. Inasmuch as the upper end of the actuator arm 16 is effectively connected to the armature 26 for movement therewith, the actuator arm 16 is also pivoted toward a second position illustrated in FIG. 3. In this position, the lower end of the actuator arm 16 is moved into a location wherein it cannot be engaged by any of the stops 15a provided on the control collar 15. Thus, the drive spring 14 is permitted to contract as discussed above to cause engagement between the input hub 12 and the output hub 13. Accordingly, it will be appreciated that selectively energization and deenergization of the electromagnetic coil 22 causes engagement and disengagement of the wrap spring clutch 11.

A flux breaker 30 is disposed within the electromagnetic coil 22 between the inner axial end of the armature and the core member 24. The flux breaker 30 is embodied as a relatively thin disc having an outer diameter which is slightly less than the inner diameter of the electromagnetic coil 22. The flux breaker 30 is preferably not affixed to the either the core member 24 or the armature 26. Rather, the entire solenoid actuator assembly 20 is tilted slightly with respect to the horizontal plane such that the flux breaker 30 is maintained in a position adjacent to the core member 24 by gravity. It will be appreciated, however, that the flux breaker 30 may be affixed to either the core member 24 or the armature 26 by any conventional means if desired. The flux breaker 30 is formed of a non-magnetically permeable material which is relatively harder than the materials from which the core member 24 and the armature 26 are composed. In the preferred embodiment, the flux breaker 30 is formed from stainless steel.

As shown in FIG. 2, a small air gap 31 is defined between the inner axial end of the armature 26 and the flux breaker 30 when the electromagnetic coil 22 is de-energized and the spring 28 urges the armature 26 to the first position. The outer diameter of the flux breaker 30 is relatively large relative to the axial distance defined by the air gap 31. As a result, the flux breaker 30 is prevented from tilting or becoming otherwise misaligned within the air gap 31 when the armature 26 is moved by the spring 28 to the first position.

In operation, the solenoid 18 is initially de-energized. As a result, the spring 28 reacts between the axial end of the housing 21 and the upper leg of the actuator arm 16 to urge such upper end away from the housing 21. Also, the armature 26 is moved to the position illustrated in FIG. 2, wherein the inner axial end thereof is spaced apart from the core member 24. At the same time, the lower end of the actuator arm 16 is moved into a position wherein it can be engaged by the stops 15a on the control collar 15 when the input hub 12 is rotated by the source of rotational power. When this occurs, the control collar 15 is prevent from rotating with the input hub 12. As discussed above, the control tang on the drive spring 14 is connected to the control collar 15 such that rotation thereof is also prevented. The relative rotation between the control tang and the input hub 12 functions to partially unwind and expand the drive spring 14, causing the input hub 12 and the output hub 13 to be uncoupled. When it is desired to engage the wrap spring clutch 11, electrical current is supplied to coil 22. The electromagnetic field generated by the energized coil 22 attracts the armature 26 toward the core member 24 until the inner axial end of the armature 26 engages the flux breaker 30, as shown in FIG. 3.

In addition to forming part of the magnetic circuit about the electromagnetic coil 22, the core member 24 functions as a backstop to limit axial movement of the armature 26. As discussed above, the flux breaker 30 is formed from a material, such as stainless steel, which is harder than the material used to form both the core member 24 and the armature 26. As a result, the flux breaker 30 is not significantly deformed when it is engaged by the armature 26, unlike prior art flux breakers.

The armature 26 and the core member 24 are susceptible to becoming slightly permanently magnetized by the electromagnetic field generated by the coil 22. The magnitude of the resultant magnetic attraction between the armature 26 and the core member 24 increases as the two components are moved closer together. The interposed flux breaker 30 minimizes this effect by providing a minimum distance between the armature 26 and the core member 24 when the armature 26 is fully retracted within the electromagnetic coil 22. The flux breaker 30, being formed of a non-magnetically permeable material, effectively reduces the magnetic attraction between the armature 26 and the core member 24. The armature 26 is thus free to rapidly move to the extended position under the urging of the spring 28 when the coil 22 is subsequently de-energized.

It will be appreciated that because the flux breaker 30 is relatively harder than the armature 26 or the core member 24, it will not significantly deform when compressed therebetween. Therefore, the minimum distance separating the armature 26 and the core member 24 will remain essentially constant as the electromagnetic coil 22 is repeatedly energized and de-energized over time.

In the embodiment of the invention described and illustrated herein, the drive spring 14 is expanded to release the engagement between the input hub 12 and the output hub 13 and is contracted to engage the input hub 12 and the output hub 13. It will be appreciated, however, that the wrap spring clutch 11 may be configured to operate in the opposite manner, wherein the drive spring 14 is contracted to release the engagement between the input hub 12 and the output hub 13 and is expanded to engage the input hub 12 and the output hub 13. Such a modification would be easily within the grasp of any person having ordinary skill in the art and is contemplated to be within the scope of this invention.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A solenoid comprising:
   a housing including an end portion, said end portion of said housing being formed from a first material;
   an armature disposed within said housing for movement relative thereto, said armature being formed from a second material;
   an electromagnetic coil supported on said housing for selectively generating an electromagnetic field to move said armature toward said end portion of said housing; and
   a flux breaker disposed between said armature and said end portion of said housing to prevent said armature from contacting said end portion of said housing when said electromagnetic field is generated, said flux breaker being formed from a third material which is harder than said first and second materials.

2. The solenoid defined in claim 1 wherein said end portion of said housing is a core member mounted in an opening formed through a portion of said housing.

3. The solenoid defined in claim 1 wherein said end portion of said housing is formed from a magnetically permeable material.

4. The solenoid defined in claim 3 wherein said end portion of said housing is formed from iron.

5. The solenoid defined in claim 1 wherein said armature is formed from a magnetically permeable material.

6. The solenoid defined in claim 5 wherein said armature is formed from iron.

7. The solenoid defined in claim 1 wherein said first material and said second material are the same material.

8. The solenoid defined in claim 7 wherein said first material and said second material are iron.

9. The solenoid defined in claim 1 wherein said flux breaker is formed of a non-magnetically permeable material.

10. The solenoid defined in claim 9 wherein said flux breaker is formed of stainless steel.

11. The solenoid defined in claim 1 further including means for urging said armature toward a first position, and wherein said armature is moved toward a second position when said electromagnetic field is generated.

12. The solenoid defined in claim 1 wherein said armature is connected to an actuator of a wrap spring clutch, movement of said actuator selectively causing engagement and disengagement thereof.

13. A wrap spring clutch comprising:
   an input hub having a cylindrical outer surface portion;
   an output hub having a cylindrical outer surface portion;
   a drive spring wrapped about portions of said cylindrical outer surfaces of said input hub and said output hub; and
   a solenoid actuator including:
      a housing including an end portion, said end portion of said housing being formed from a first material;
      an armature disposed within said housing for movement relative thereto and connected to operate said drive spring, said armature being formed from a second material;
      an electromagnetic coil supported on said housing for selectively generating an electromagnetic field to move said armature toward said end portion of said housing; and
      a flux breaker disposed between said armature and said end portion of said housing to prevent said armature from contacting said end portion of said housing when said electromagnetic field is generated, said flux breaker being formed from a third material which is harder than said first and second materials.

14. The wrap spring clutch defined in claim 13 wherein said end portion of said housing is a core member mounted in an opening formed through a portion of said housing.

15. The wrap spring clutch defined in claim 13 wherein said end portion of said housing is formed from a magnetically permeable material.

16. The wrap spring clutch defined in claim 15 wherein said end portion of said housing is formed from iron.

17. The wrap spring clutch defined in claim 13 wherein said armature is formed from a magnetically permeable material.

18. The wrap spring clutch defined in claim 17 wherein said armature is formed from iron.

19. The wrap spring clutch defined in claim 13 wherein said flux breaker is formed of a non-magnetically permeable material.

20. The wrap spring clutch defined in claim 19 wherein said flux breaker is formed of stainless steel.

* * * * *